United States Patent [19]
Mott

[11] Patent Number: 5,647,811
[45] Date of Patent: Jul. 15, 1997

[54] CHAIN TENSIONER WITH INTEGRAL ARM

[75] Inventor: Philip J. Mott, Dryden, N.Y.

[73] Assignee: Borg-Warner Automotive, Inc., Sterling Heights, Mich.

[21] Appl. No.: 588,451

[22] Filed: Jan. 18, 1996

[51] Int. Cl.[6] ............................. F16H 57/04; F16H 7/08; F16N 7/02
[52] U.S. Cl. ................................ 474/91; 474/111; 184/16
[58] Field of Search .................... 474/101, 110, 474/111, 133, 135, 91; 184/15.1, 16

[56] References Cited

U.S. PATENT DOCUMENTS

| | | |
|---|---|---|
| 3,896,834 | 7/1975 | Paul, Jr. . |
| 4,708,696 | 11/1987 | Kimura et al. . |
| 5,116,284 | 5/1992 | Cho . |
| 5,184,982 | 2/1993 | Shimaya et al. . |
| 5,184,983 | 2/1993 | Shimaya et al. . |
| 5,222,917 | 6/1993 | Shimaya et al. . |
| 5,277,664 | 1/1994 | Mott . |
| 5,314,388 | 5/1994 | Suzuki et al. . |
| 5,318,482 | 6/1994 | Sato et al. . |
| 5,346,436 | 9/1994 | Hunter et al. . |

*Primary Examiner*—Tamara L. Graysay
*Assistant Examiner*—Tony Boyd
*Attorney, Agent, or Firm*—Hugh A. Abrams, Esq.; Greg Dziegielewski, Esq.

[57] ABSTRACT

An integrated chain tensioner having a tensioner arm that includes a first side, a second side, a first end, and a second end. The tensioner arm also includes a fluid reservoir defined by at least a portion of the first side, the second side, the first end, and the second end. Further, a pivot bore is disposed in the first end and a tensioner bore is disposed in the first side of the tensioner arm. A hydraulic tensioner is disposed in the tensioner bore such that the hydraulic tensioner is in communication with the reservoir.

19 Claims, 4 Drawing Sheets

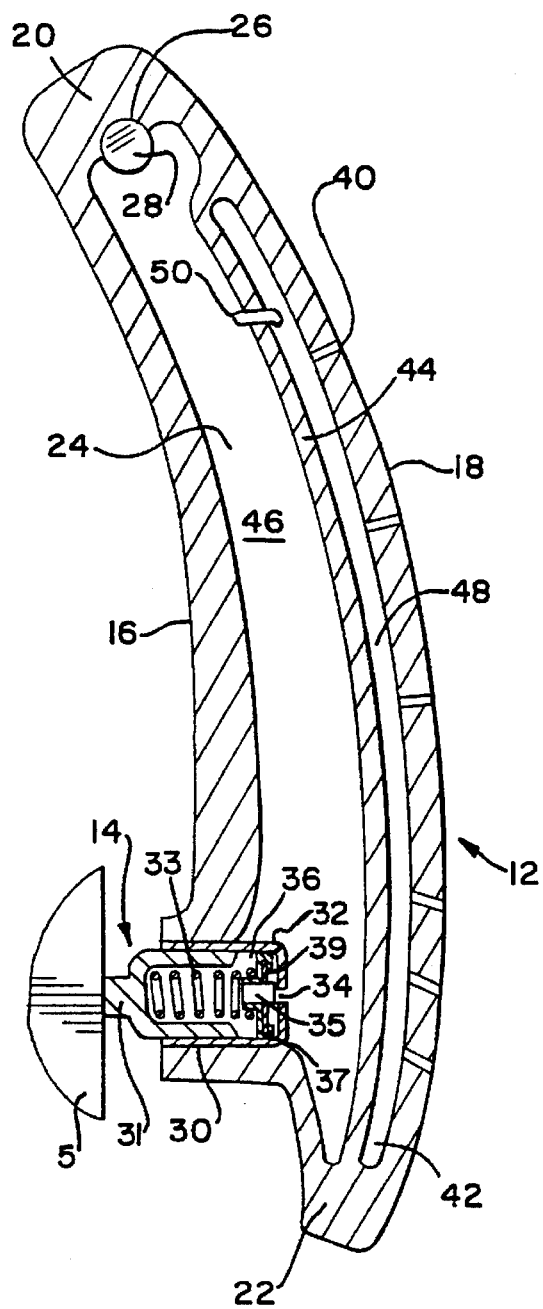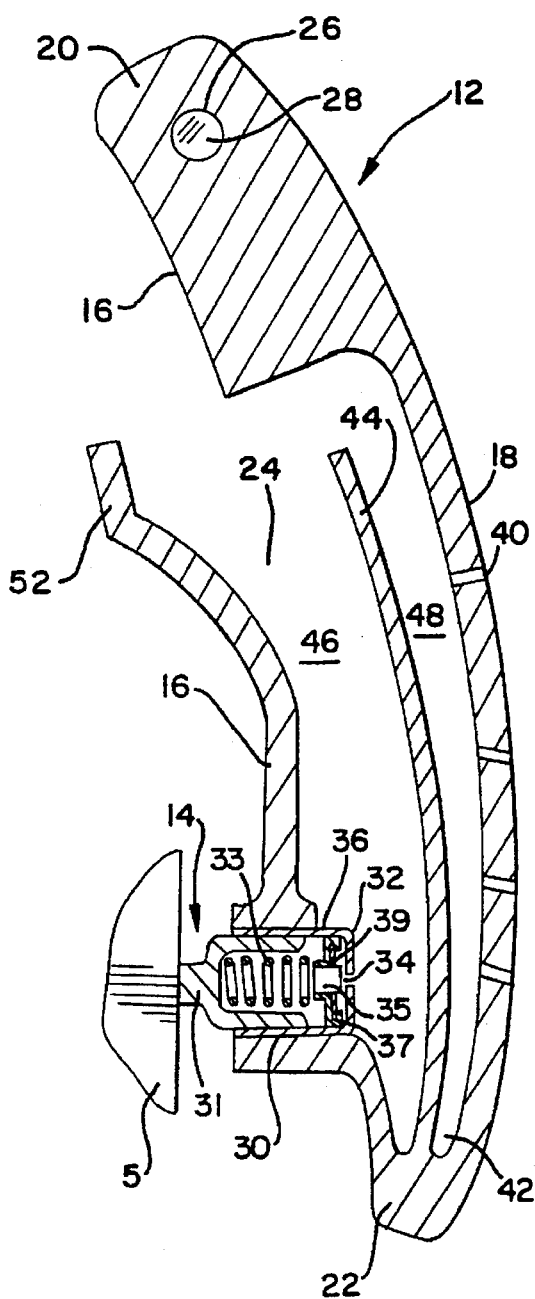

CHAIN TENSIONER WITH INTEGRAL ARM

BACKGROUND OF THE INVENTION

This invention relates to tensioners used with chain drives in automotive timing applications and more particularly to an integrated chain tensioner and tensioner arm.

Chain tensioning devices, such as hydraulic chain tensioners, are used as a control device for a power transmission chain, or any similar power transmission devices, as the chain travels between a plurality of sprockets. Generally, it is important to impart and maintain a certain degree of tension to the chain to prevent noises, slippage, or tooth jumping. Prevention of such tooth jumping is especially important in the case of a chain driven camshaft in an internal combustion engine because tooth jumping will throw off the camshaft timing by several degrees, possibly rendering the engine inoperative or causing damage. However, in the harsh environment in which an internal combustion engine operates, chain tension can vary between excessively high or low levels as a result of the wide variations in temperatures and differences between the coefficients of linear expansion among the various parts of the engine, including the chain and the tensioner. Moreover, wear to the chain components, during prolonged use, can result in a decrease in the tension of the chain. In addition, cam shaft and crank shaft induced torsional vibrations cause chain tension to vary considerably. This tension variation results in chain elongation, determined by chain stiffness.

Hydraulic chain tensioners typically have a plunger slidably fitted into a chamber and biased outward by a spring to provide tension to the chain. A lever, arm, or shoe is often used at the end of the plunger to assist in the tensioning of the chain. The hydraulic pressure from an external source, such as an oil pump or the like, flows into the chamber through passages formed in the housing. The plunger is easily moved outward by the combined efforts of the hydraulic pressure and the spring force.

When the plunger tends to move in a reverse direction (inward) away from the chain, typically a check valve is provided to restrict the flow of fluid from the chamber. In such a fashion, the tensioner achieves a so-called no-return function, i.e., movements are easy in one direction (outward) but difficult in the reverse direction (inward).

One example of a chain tensioner which uses a hydraulic tensioner and a pivoted lever to tension a chain is described in Sato et al., U.S. Pat. No. 5,318,482. Sato et al. show a conventional hydraulic tensioner with a plunger pressing a pivoted lever against a chain to impart an appropriate tension to the chain. The hydraulic tensioner and the pivoted lever, however, are completely separate from each other.

Another example of a chain tensioner which uses a hydraulic tensioner and a shoe to tension a chain is described in Suzuki et al., U.S. Pat. No. 5,314,388. Suzuki et al. show an oil-operated tensioner with a plunger forcing a shoe against a chain to impart a tension to the chain. The tensioner is continuously supplied with oil from an external source such as an oil pump. Furthermore, the shoe is mounted outside the tensioner on the outer end of the plunger.

Accordingly, it is an object of the present invention to provide a hydraulic chain tensioner that is an improvement over the prior art hydraulic chain tensioners. In the present invention, a hydraulic chain tensioner is integrated with a tensioner arm that has a fluid reservoir for supplying the hydraulic chain tensioner with oil. As a result, the integrated chain tensioner of the present invention is simpler and easier to install as compared to prior art hydraulic chain tensioners.

SUMMARY OF THE INVENTION

The present invention provides an integrated chain tensioner having a tensioner arm that includes a first side, a second side, a first end, and a second end. A fluid reservoir is defined by at least a portion of the first and second sides, and the first and second ends. The tensioner includes a pivot bore disposed in the first end and a tensioner bore disposed in the first side of the tensioner arm. A hydraulic tensioner is disposed in the tensioner bore such that the hydraulic tensioner is in communication with the reservoir.

In one embodiment of the present invention, the tensioner arm includes at least one aperture in the second side and may also include a catch disposed on the first side of the tensioner arm.

In another embodiment, the tensioner arm further includes a cavity located near the tensioner bore and defined by at least a portion of the first side, the second side, and the second end. In addition, a dam is disposed near the second end. Also, a sealing cup may be mounted in the tensioner bore to surround at least a portion of the hydraulic tensioner.

The fluid reservoir of the tensioner arm may further include a first and a second chamber. The first chamber is in communication with the pivot bore and the hydraulic tensioner. Preferably, a metering orifice is provided to connect the first and second chambers.

The tensioner arm may further include a first and a second channel. The first channel provides a connection between the pivot bore and the fluid reservoir. The second channel provides a connection between the fluid reservoir and the hydraulic tensioner.

BRIEF DESCRIPTION OF THE DRAWINGS

FIG. 3 is a side sectional view of an alternative embodiment of the integrated chain tensioner and tensioner arm of the present invention.

FIG. 4 is a side sectional view of another embodiment of the integrated chain tensioner and tensioner arm of the present invention.

DETAILED DESCRIPTION OF THE PREFERRED EMBODIMENTS

Figure 1:
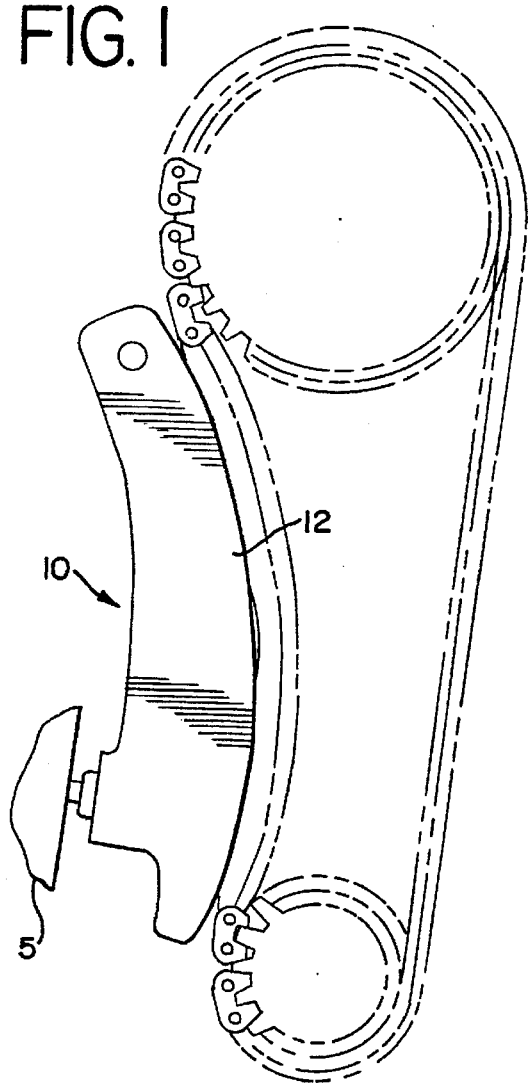
FIG. 1 is a schematic of the integrated chain tensioner and tensioner arm of the present invention acting on a chain.

Turning now to the drawings, FIG. 1 depicts the integrated chain tensioner of the present invention used to tension a chain. The integrated chain tensioner 10 is positioned close to the chain that needs to be tensioned. As the chain begins to loosen, the tensioner arm 12 exerts a force on the chain to maintain tension on the chain.

Figure 2:
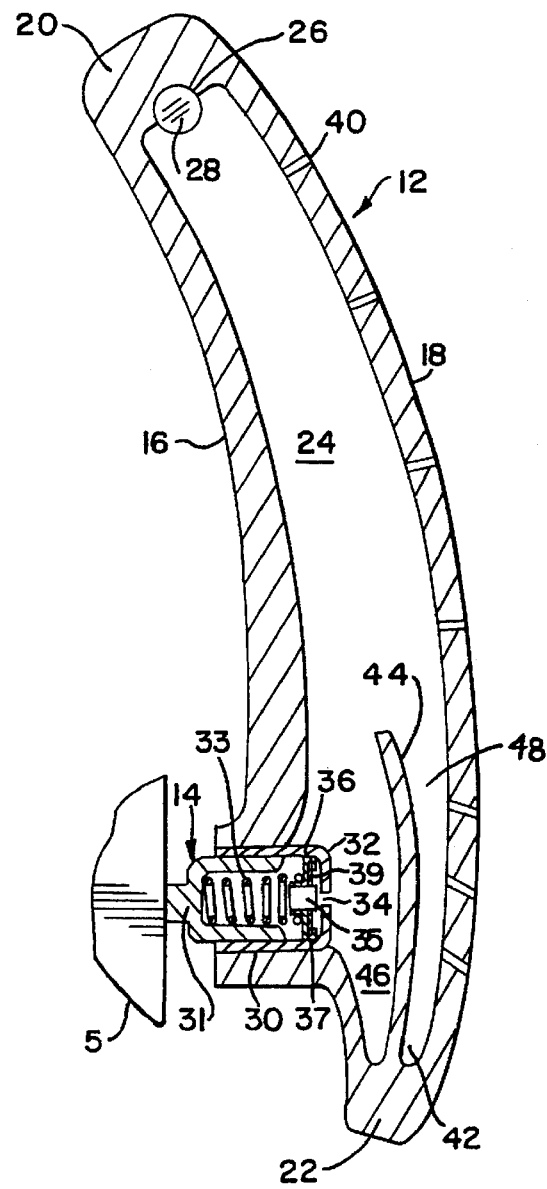
FIG. 2 is a side sectional view of a preferred embodiment of the integrated chain tensioner and tensioner arm of the present invention.

In a preferred embodiment, as best shown in FIG. 2, the integrated chain tensioner 10 of the present invention comprises a tensioner arm 12 and a hydraulic tensioner 14. The tensioner arm and the hydraulic tensioner are integrated to form a chain tensioner with only one overall component.

The tensioner arm 12 has a first side 16 and a second side 18 spaced from the first side. A first end 20 is disposed between the first and second sides. A second end 22 is disposed between the first and second sides, and spaced from the first end. Preferably, the first and second ends join the first and second sides.

As shown in FIG. 2, the second side provides a chain wear surface which is in contact with the chain to be tensioned. Preferably, the second side is arcuately shaped to provide a suitable chain travel surface. Of course, it will be understood by one skilled in the art that the second side can have any suitable shape as dictated by manufacturing and consumer preference concerns.

The tensioner arm 12 may be made from any durable wear resistant material. A synthetic material, such as nylon, which has high wearability and durability characteristics can be used. In particular, Nylon 6/6 is one commercially available material that may be used. Alternatively, the tensioner arm may be made of PEEK (polyester ethylene ketone), which also has high wearability and durability characteristics. The tensioner arm may also be made of a composite of materials, such as Nylon 6/6 with a glass fill.

In the embodiments shown in FIGS. 2–5, a fluid reservoir 24 is defined by at least a portion of the first side, the second side, the first end, and the second end. The fluid reservoir may be filled with any type of fluid. Preferably, the fluid reservoir is filled with a lubricating fluid such as oil.

The tensioner arm may also have at least one aperture 40 disposed in the second side. The aperture allows the fluid in the fluid reservoir to lubricate the chain. The number of apertures may be varied depending on the desired amount of lubrication for a given wear location of the chain.

As also seen in FIGS. 2–5, a pivot bore 26 may be disposed in the first end 20 of the tensioner arm. The pivot bore 26 may be in communication with the fluid reservoir 24 as shown in FIGS. 2–3. This communication allows the fluid reservoir to be filled with fluid through the pivot bore.

Figure 6:
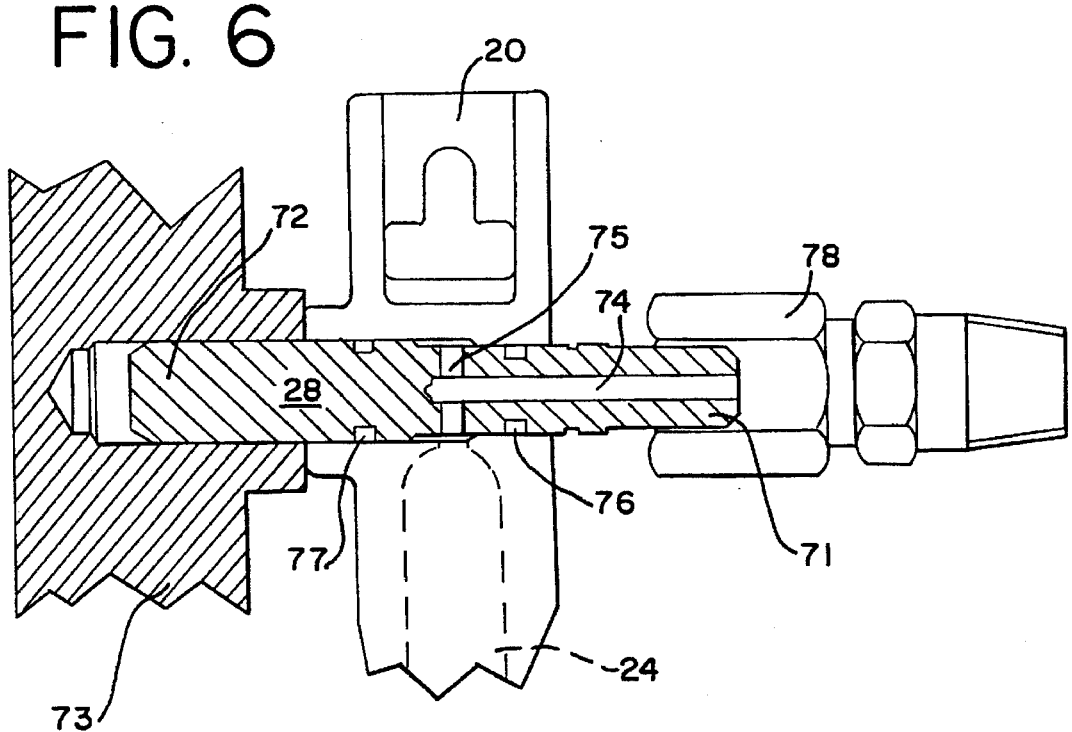
FIG. 6 is a sectional view of a pivot pin used to pivotally mount the integrated chain tensioner and tensioner arm of FIGS. 2–3.

A pivot pin 28 may be disposed in the pivot bore 26 to pivotally mount the tensioner arm 12 near the chain that needs to be tensioned. In the embodiments depicted in FIGS. 2–3, the pivot pin preferably is adapted to permit filling of the fluid reservoir through the pivot bore even though the pivot pin is disposed in the pivot bore. As shown in FIG. 6, the pivot pin has a first and a second end 71, 72, the second end 72 being mounted into a fixed structure 73, such as an engine. A central bore 74 extends from the first end 71 into the pivot pin 28. A lateral bore 75 perpendicular to and in communication with the central bore 74 extends through the pivot pin 28.

As shown in FIG. 6, a portion of the outer diameter of the pivot pin surrounding the lateral bore is less than the diameter of the pivot bore. As a result, the lateral bore is in communication with the pivot bore. Since the pivot bore of the embodiments shown in FIGS. 2–3 is in communication with the fluid reservoir, the lateral bore is also in communication with the fluid reservoir through the pivot bore. Therefore, fluid may be supplied to the fluid reservoir through the pivot pin by way of the central bore, the lateral bore, and the pivot bore. In one preferred embodiment, the fluid is supplied through the pivot pin from a bore on the block side of the engine.

In addition, a first O-ring 76 may be placed around the pivot pin between the first end 71 of the pivot pin and the lateral bore 75. A second O-ring 77 may be placed around the pivot pin between the second end 72 of the pivot pin and the lateral bore 75. Also, a fastener 78 may be disposed on the first end of the pivot pin to prevent the tensioner arm 12 from sliding off the pivot pin and to prevent fluid from draining out of the fluid reservoir 24 through the pivot pin 28.

As shown in FIGS. 2-5, a tensioner bore 30 is disposed in the first side near the second end of the tensioner arm. The tensioner bore receives a hydraulic tensioner 14 so that it is in communication with the fluid reservoir. As seen in FIG. 2, the hydraulic tensioner 14 comprises a sealing cup 32, a plunger 31, a support plate 37, a spring 33, and a check valve 35.

The sealing cup 32 is sealably mounted in the tensioner bore 30. The sealing cup may be formed integral with the first side of the tensioner arm or may preferably be a separate element. The sealing cup 32 includes an aperture 34 for allowing fluid to flow from the fluid reservoir into the sealing cup. In addition, the sealing cup 32 may have an orifice 36 proximate to the first end of the tensioner arm and in communication with the fluid reservoir. In this arrangement, the orifice 36 serves as a fluid leak path and an air purge.

The plunger 31 is slidably fitted into the sealing cup 32 and the support plate 37 is sealably mounted in the sealing cup 32 near the aperture 34. The support plate also has a central bore 39.

The spring 33 is disposed between the plunger 31 and the support plate 37. As a result, the spring biases the plunger outwardly from the sealing cup 32 and against a fixed surface 5, such as an engine or a reaction plate.

The check valve 35 is disposed in the central bore 39 of the support plate 37. The check valve permits fluid to flow from the fluid reservoir and the aperture of the sealing cup through the central bore 39. However, the check valve restricts fluid from flowing out of the central bore and back into the fluid reservoir through the aperture of the sealing cup.

Generally, any type of check valve will work with the hydraulic tensioner of the present invention. For example, a ball check valve, such as that disclosed in Kimura et al., U.S. Pat. No. 4,708,696, the entire disclosure of which is incorporated herein by reference, may be used in the hydraulic tensioner of the present invention. Alternatively, a spring check valve, such as that disclosed in Paul Jr., U.S. Pat. No. 3,896,834, the entire disclosure of which is incorporated herein by reference, may be used in the hydraulic tensioner of the present invention. Moreover, a ball and spring check valve, such as that disclosed in Cho, U.S. Pat. No. 5,116,284, the entire disclosure of which is incorporated herein by reference, may be used in the hydraulic tensioner of the present invention. Finally, a variable orifice check valve, such as that disclosed in Mott, U.S. Pat. No. 5,277,664, the entire disclosure of which is incorporated herein by reference, may also be used in the hydraulic tensioner of the present invention.

A cavity 42 may be located near the tensioner bore 30 and defined by at least a portion of the first side 16, the second side 18, and the second end 22. The cavity 42 is positioned closer to the second end than the tensioner bore. As a result, the cavity is able to collect debris or sludge that is found in the fluid reservoir and therefore provide a more effective operation of the hydraulic tensioner. It is therefore important that the cavity does not extend beyond the tensioner bore toward the first end 20.

The tensioner arm may have a dam 44 disposed near the second end 22 between the first and second sides 16, 18.

Preferably, the dam is integral with the second end and extends into the reservoir beyond the tensioner bore. Alternatively, the dam may be integral with either the first or second side and extend into the reservoir beyond the tensioner bore such that the dam is L-shaped. The dam prevents the loss of fluid from the fluid reservoir during shutdown conditions and excessive chain lubrication. Therefore, it is important that the dam extends beyond the tensioner bore. The fluid trapped by the dam provides the hydraulic tensioner with the fluid necessary for its operation.

The dam 44 separates the fluid reservoir 24 into a first and a second chamber 46, 48. In the embodiment shown in FIG. 3, the first chamber 46 is in communication with the pivot bore 26 and the hydraulic tensioner 14. The second chamber 48 is in contact with the second side 18 and in communication with the tensioned chain through any apertures 40 that are disposed in the second side 18. As a result, this embodiment provides separate control of the fluid supply for the hydraulic tensioner and the tensioned chain.

In addition, a metering orifice 50 may be used to connect the first and second chambers as shown in FIG. 3. The metering orifice allows both more control and easier filling of the first and second chambers.

In the embodiment shown in FIG. 4, the first side is separated from the first end to form a catch 52. The catch directs fluid that drains from external sources to the fluid reservoir 24 through the opening in the first side.

Figure 5:
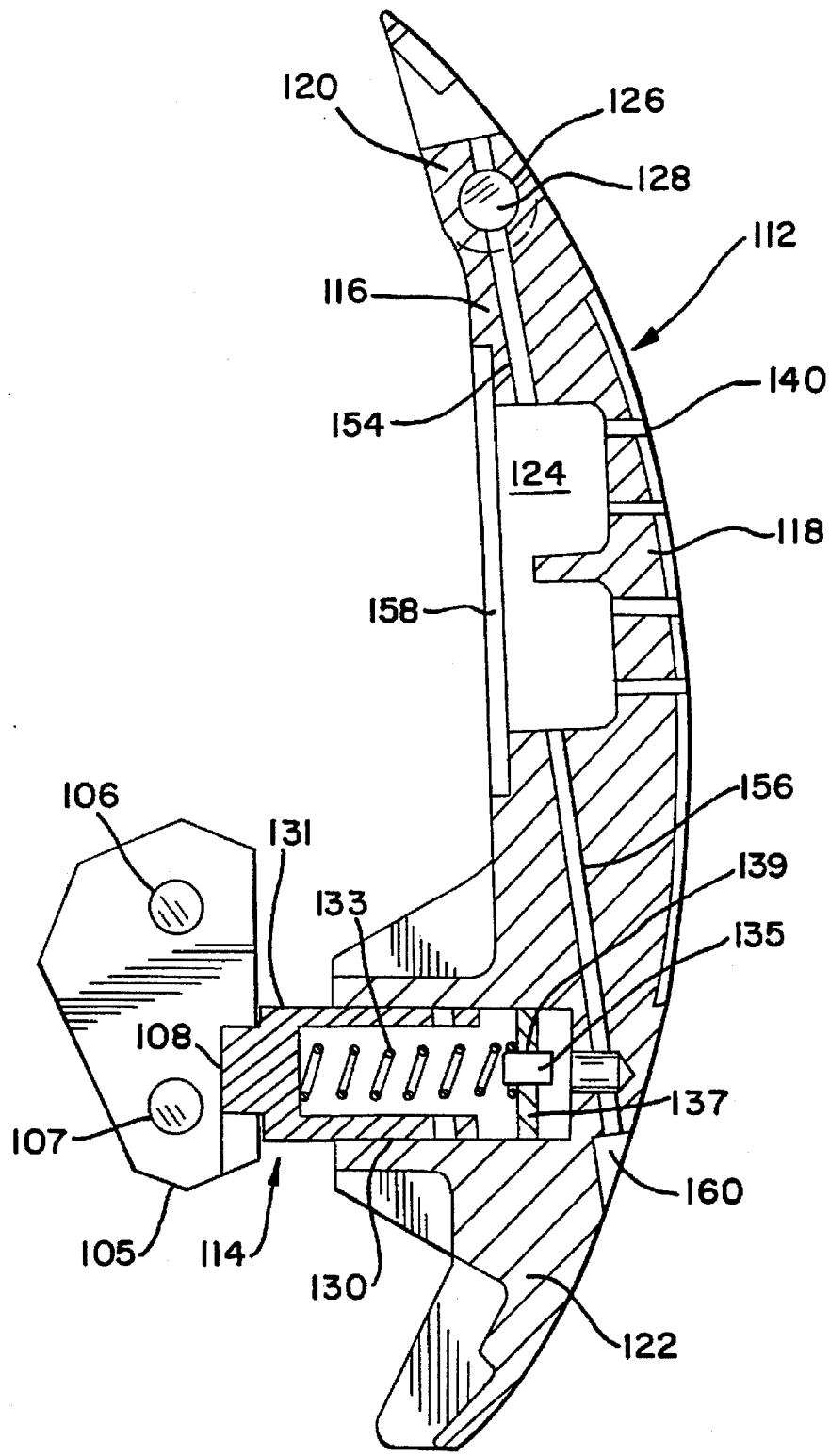
FIG. 5 is a side sectional view of another embodiment of the integrated chain tensioner and tensioner arm of the present invention.

Referring now to FIG. 5, another embodiment of the integrated chain tensioner of the present invention is shown. The chain tensioner comprises a tensioner arm 112 and a hydraulic tensioner 114. Similar to the preferred embodiment, the tensioner arm and the hydraulic tensioner are integrated to form a chain tensioner with only one overall component.

The tensioner arm 112 has a first side 116 and a second side 118 spaced from the first side. A first end 120 is disposed between the first and second sides. Also, a second end 122 is disposed between the first and second sides, and spaced from the first end.

A fluid reservoir 124 is defined by at least a portion of the first side, the second side, the first end, and the second end.

The tensioner arm may also have at least one aperture 140 disposed in the second side. The aperture allows the fluid in the fluid reservoir to lubricate the chain. The number of apertures may be varied depending on the desired amount of lubrication for a given wear location of the chain.

A pivot bore 126 may be disposed in the first end 120 of the tensioner arm. The tensioner arm 112 also has a first channel 154 that provides a connection between the pivot bore 126 and the fluid reservoir 124. As a result, the pivot bore 126 is in communication with the fluid reservoir 124 by way of the first channel 154. This communication allows the fluid reservoir to be filled with fluid through the pivot bore.

Figure 7:
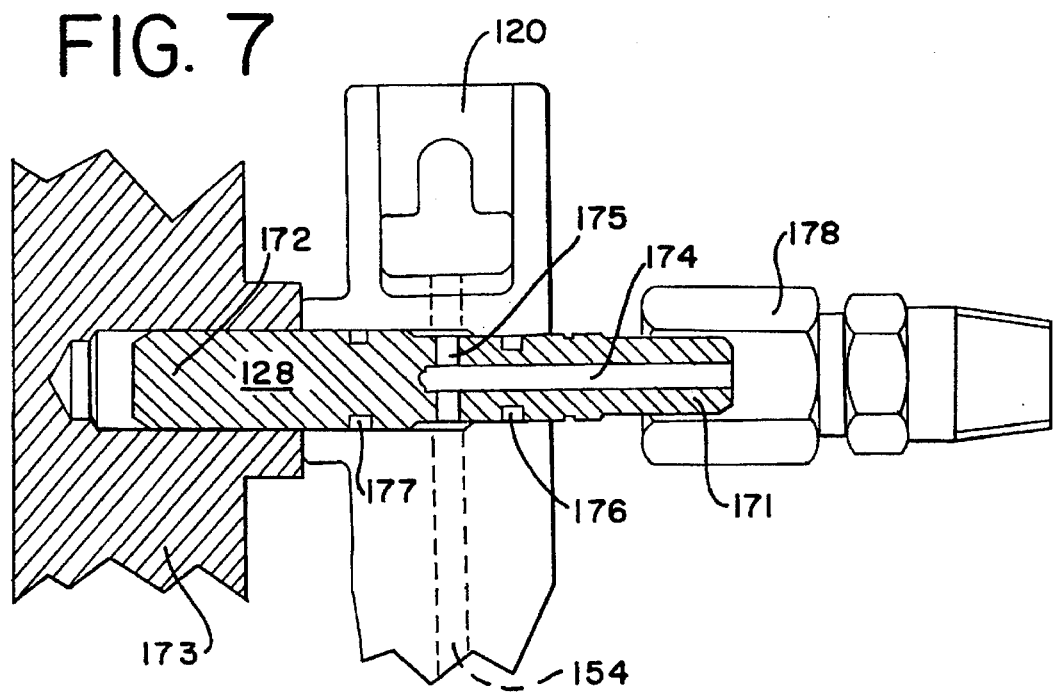
FIG. 7 is a sectional view of a pivot pin used to pivotally mount the integrated chain tensioner and tensioner arm of FIG. 5.

A pivot pin 128 may be disposed in the pivot bore 126 to pivotally mount the tensioner arm near the chain that needs to be tensioned. Preferably, the pivot pin is adapted to permit filling of the fluid reservoir through the pivot bore even though the pivot pin is disposed in the pivot bore. As shown in FIG. 7, the pivot pin has a first and a second end 171, 172, the second end 172 being mounted into a fixed structure 173, such as an engine. A central bore 174 extends from the first end 171 into the pivot pin 128. A lateral bore 175 perpendicular to and in communication with the central bore 174 extends through the pivot pin 128.

As shown in FIG. 7, at least a portion of the outer diameter of the pivot pin surrounding the lateral bore is less than the diameter of the pivot bore. As a result, the lateral bore is in communication with the pivot bore. Since the pivot bore of the embodiment shown in FIG. 5 is in communication with the fluid reservoir by way of the first channel 154, the lateral bore is also in communication with the fluid reservoir through the pivot bore 126 and the first channel 154. Therefore, fluid may be supplied to the fluid reservoir through the pivot pin by way of the central bore, the lateral bore, the pivot bore, and the first channel.

In addition, a first O-ring 176 may be placed around the pivot pin between the first end 171 of the pivot pin and the lateral bore 175. A second O-ring 177 may be placed around the pivot pin between the second end 172 of the pivot pin and the lateral bore 175. Also, a fastener 178 may be disposed on the first end of the pivot pin to prevent the tensioner arm 112 from sliding off the pivot pin and to prevent fluid from draining out of the fluid reservoir 124 through the pivot pin 128.

A tensioner bore 130 is disposed in the first side near the second end of the tensioner arm. The tensioner arm 112 also has a second channel 156 that provides a connection between the fluid reservoir 124 and the tensioner bore 130.

The tensioner bore 130 receives a hydraulic tensioner 114 so that the hydraulic tensioner is in communication with the second channel 156. As seen in FIG. 5, the hydraulic tensioner 114 comprises a plunger 131, a support plate 137, a spring 133, and a check valve 135.

The plunger 131 is slidably fitted into the tensioner bore 130 and the support plate 137 is sealably mounted into the tensioner bore 130 near the second channel 156. The support plate also has a central bore 139.

The spring 133 is disposed between the plunger 131 and the support plate 137. As a result, the spring biases the plunger outwardly from the tensioner bore and against a fixed reaction plate 105.

The reaction plate 105 is mounted into a fixed structure (not shown), such as an engine, with a first and a second fastener 106, 107. The reaction plate may also have a slot 108, as shown in FIG. 5. The slot is adapted to receive the plunger and allow the plunger to slide within the slot in a direction parallel to the direction that the chain is traveling. The slot, however, restricts movement of the plunger in a horizontal direction perpendicular to the direction that the chain is traveling.

The check valve 135 is disposed in the central bore 139 of the support plate 137. The check valve permits fluid to flow from the second channel and the tensioner bore and through the central bore 139. However, the check valve restricts fluid from flowing out of the central bore and back into the second channel. Similar to the preferred embodiment, any of the previously mentioned types of check valves may be used in the hydraulic tensioner of the embodiment shown in FIG. 5.

Also in this embodiment, the fluid reservoir may have an opening 158 in the first side 116 and a removable cover for the opening.

Similarly, a drain bore 160 may be disposed near the second end 122 to provide a connection between the second channel 156 and the second side 118. The drain bore allows easy draining of the fluid reservoir through the second channel and the second side. In addition, a drain plug may be used to cover the drain bore and prevent draining of the fluid reservoir.

The integrated chain tensioner of the present invention operates in the following manner. The integrated chain tensioner is pivotally mounted about the pivot pin near the chain that needs to be tensioned. The hydraulic tensioner draws in fluid from the fluid reservoir through the aperture of the sealing cup or the second channel of the tensioner arm as the spring biases the plunger outwardly from the sealing cup or tensioner bore, respectively. The combined efforts of the spring and the fluid pressure in the sealing cup or tensioner bore cause the plunger to contact the fixed surface.

With the plunger contacting the fixed surface, the hydraulic tensioner forces the tensioner arm against the chain that needs to be tensioned. Since the check valve only allows fluid to flow into the hydraulic tensioner and restricts fluid from flowing out of the hydraulic tensioner, the fluid pressure in the hydraulic tensioner is maintained. Thus, the fluid pressure, along with the force of the spring, continues to bias the plunger against the fixed surface, thereby causing the tensioner arm to tension the chain.

After the chain is tensioned, the chain tensioner of the present invention may also lubricate the tensioned chain. The tensioned chain is lubricated by an aperture through the second side of the tensioner arm. This aperture allows fluid to flow from the fluid reservoir to the tensioned chain. As a result, the tensioned chain is lubricated as it travels along the second side of the tensioner arm.

In operation, the present invention can be applied with particular advantage to internal combustion engine timing systems having a chain of small center distance between sprockets. Of course, it is understood by one skilled in the art that the first and second sides of the tensioner arm may have any suitable length necessary to provide the desired tensioning force. Likewise, the length of the plunger in the hydraulic tensioner can be any suitable length necessary to provide the desired tensioning force. It is also readily apparent that the present invention can be utilized to tension other types of devices.

Those skilled in the art to which the invention pertains may make modifications and other embodiments employing the principles of this invention without departing from its spirit or essential characteristics, particularly upon considering the foregoing teachings. The described embodiments are to be considered in all respects only as illustrative and not restrictive and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. An integral chain tensioner and tensioner arm assembly comprising:
   (a) a tensioner arm that includes:
     (i) a first side;
     (ii) a second side spaced from the first side;
     (iii) a first end;
     (iv) a second end spaced from the first end;
     (v) a fluid reservoir defined by at least a portion of the first and second sides, and the first and second ends;
     (vi) a pivot bore disposed in the first end;
     (vii) a tensioner bore disposed in the first side; and
   (b) a hydraulic tensioner disposed in the tensioner bore and in communication with the fluid reservoir.

2. The integral chain tensioner and tensioner arm assembly of claim 1 wherein the hydraulic tensioner further comprises:
   a sealing cup mounted in the tensioner bore, the sealing cup having an aperture in communication with the fluid reservoir;
   a plunger slidably fitted into the sealing cup;
   a support plate mounted in the sealing cup near the aperture, the support plate having a central bore;
   a spring disposed between the plunger and the support plate; and
   a check valve disposed in the central bore of the support plate.

3. The integral chain tensioner and tensioner arm assembly of claim 2 wherein the sealing cup further includes an orifice proximate the first end, the orifice being in communication with the fluid reservoir.

4. The integral chain tensioner and tensioner arm assembly of claim 1 wherein the tensioner arm further includes at least one aperture in the second side.

5. The integral chain tensioner and tensioner arm assembly of claim 1 wherein the pivot bore is in communication with the fluid reservoir.

6. The integral chain tensioner and tensioner arm assembly of claim 5 further comprising a pivot pin disposed in the pivot bore, the pivot pin having a central bore extending from an end of the pivot pin and a lateral bore in communication with the central bore and the pivot bore.

7. The integral chain tensioner and tensioner arm assembly of claim 1 further comprising a pivot pin disposed in the pivot bore.

8. The integral chain tensioner and tensioner arm assembly of claim 1 wherein the tensioner arm further includes a cavity located near the tensioner bore and defined by at least a portion of the first side, the second side, and the second end.

9. The integral chain tensioner and tensioner arm assembly of claim 1 wherein the tensioner arm further includes a dam disposed in the fluid reservoir to define a first and a second chamber.

10. The integral chain tensioner and tensioner arm assembly of claim 9 wherein the first chamber is in communication with the pivot bore and the hydraulic tensioner, and a metering orifice connects the first and second chambers.

11. The integral chain tensioner and tensioner arm assembly of claim 1 wherein the first side of the tensioner arm further includes a catch.

12. The integral chain tensioner and tensioner arm assembly of claim 1 wherein the tensioner arm further includes a first and a second channel, the first channel providing a connection between the pivot bore and the fluid reservoir, the second channel providing a connection between the fluid reservoir and the tensioner bore.

13. The integral chain tensioner and tensioner arm assembly of claim 12 wherein the hydraulic tensioner further comprises:
   a plunger slidably fitted into the tensioner bore;
   a support plate mounted in the tensioner bore near the second channel, the support plate having a central bore;
   a spring disposed between the plunger and the support plate; and
   a check valve disposed in the central bore of the support plate.

14. The integral chain tensioner and tensioner arm assembly of claim 12 wherein the tensioner arm further includes at least one aperture in the second side.

15. The integral chain tensioner and tensioner arm assembly of claim 12 further comprising a pivot pin disposed in the pivot bore, the pivot pin having a central bore extending from an end of the pivot pin and a lateral bore in communication with the central bore and the pivot bore.

16. An integral chain tensioner and tensioner arm assembly comprising:

(a) a tensioner arm that includes:
  (i) a first side;
  (ii) a second side spaced from the first side, the second side having at least one aperture;
  (iii) a first end;
  (iv) a second end spaced from the first end;
  (v) a fluid reservoir defined by at least a portion of the first and second sides, and the first and second ends;
  (vi) a pivot bore disposed in the first end and in communication with the fluid reservoir;
  (vii) a tensioner bore disposed in the first side; and
(b) a hydraulic tensioner disposed in the tensioner bore and in communication with the fluid reservoir, the hydraulic tensioner including:
  (i) a sealing cup mounted in the tensioner bore, the sealing cup having an aperture in communication with the fluid reservoir;
  (ii) a plunger slidably fitted into the sealing cup;
  (iii) a support plate mounted in the sealing cup near the aperture, the support plate having a central bore;
  (iv) a spring disposed between the plunger and the support plate; and
  (v) a check valve disposed in the central bore of the support plate.

17. The integral chain tensioner and tensioner arm assembly of claim 16 further comprising:
  a pivot pin disposed in the pivot bore;
  a cavity located near the tensioner bore and defined by at least a portion of the first side, the second side, and the second end; and
  a dam disposed in the fluid reservoir to define a first and a second chamber.

18. A chain tensioner comprising:
(a) a tensioner arm that includes:
  (i) a first side;
  (ii) a second side spaced from the first side, the second side having at least one aperture;
  (iii) a first end;
  (iv) a second end spaced from the first end;
  (v) a fluid reservoir defined by at least a portion of the first and second sides, and the first and second ends;
  (vi) a pivot bore disposed in the first end and in communication with the fluid reservoir;
  (vii) a tensioner bore disposed in the first side;
(b) a hydraulic tensioner disposed in the tensioner bore and in communication with the fluid reservoir; and
(c) a first and a second channel, the first channel providing a connection between the pivot bore and the fluid reservoir, the second channel providing a connection between the fluid reservoir and the hydraulic tensioner.

19. The integral chain tensioner and tensioner arm assembly of claim 18 wherein the hydraulic tensioner further comprises:
  a plunger slidably fitted into the tensioner bore;
  a support plate mounted in the tensioner bore near the second channel, the support plate having a central bore;
  a spring disposed between the plunger and the support plate; and
  a check valve disposed in the central bore of the support plate.

* * * * *